United States Patent [19]
Edgecombe et al.

[11] Patent Number: 4,486,977
[45] Date of Patent: Dec. 11, 1984

[54] METHOD AND APPARATUS FOR GROWING AND HARVESTING LIVING ORGANISMS

[75] Inventors: Dale W. Edgecombe; William L. Webster, both of Decatur, Ill.

[73] Assignee: Edgecombe Enterprises International, Inc., Decatur, Ill.

[21] Appl. No.: 407,331

[22] Filed: Aug. 12, 1982

[51] Int. Cl.³ .............................................. A01G 31/00
[52] U.S. Cl. ...................................................... 47/59
[58] Field of Search .................. 47/59, 60, 1.2, 61, 47/86, 64, 62, 65

[56] References Cited

U.S. PATENT DOCUMENTS

| | | | |
|---|---|---|---|
| Re. 28,407 | 5/1975 | Kuhn et al. | 47/11 |
| 1,033,290 | 7/1912 | Taylor | 47/17 |
| 1,121,722 | 12/1914 | Fessenden | 47/17 |
| 1,142,539 | 6/1915 | Stahelin | 47/65 |
| 1,753,980 | 4/1930 | Baumgartner | 47/17 |
| 1,939,015 | 12/1933 | McLellan | 47/17 |
| 2,614,366 | 10/1952 | Fleklin | 47/1 |
| 2,789,668 | 4/1957 | Martin | 189/2 |
| 3,284,948 | 11/1966 | Kyle | 47/1.2 |
| 3,348,922 | 10/1967 | Bose et al. | 47/62 |
| 3,660,933 | 5/1972 | Wong, Jr. | 47/62 |
| 3,824,736 | 7/1974 | Davis | 47/17 |
| 3,866,334 | 2/1975 | Huang | 34/93 |
| 3,913,758 | 10/1975 | Faircloth et al. | 214/38 BB |
| 3,925,928 | 12/1975 | Constantinescu et al. | 47/17 |
| 4,068,405 | 1/1978 | Campbell et al. | 47/65 |
| 4,108,373 | 8/1978 | Chiapale et al. | 237/1 A |
| 4,163,342 | 8/1979 | Fogg et al. | 47/59 |
| 4,173,212 | 11/1979 | Whitcomb | 126/430 |
| 4,216,615 | 8/1980 | Soderberg et al. | 47/17 |
| 4,236,350 | 12/1980 | Hasselbach, Sr. | 47/17 |

*Primary Examiner*—Robert E. Bagwill
*Assistant Examiner*—Bradley M. Lewis

[57] ABSTRACT

This invention relates to a method and apparatus for growing and harvesting living organisms, including plants such as vegetable produce. The method and apparatus have particular utility in the hydroponics industry in which plants are grown in a nutrient solution.

The method comprises the steps of providing an enclosed, top-openable growing chamber having limited free space and being suitable for receiving a removable structure supporting the living organisms; exposing the living organisms in the chamber to a growth-inducing nutrient solution for a period sufficient to induce substantial growth in the living organisms under the conditions maintained in the chamber; substantially continuously removing a portion of the nutrient solution from the chamber, restoring the nutrient quality thereof and recycling the restored nutrient solution to the chamber; controlling the temperature within the chamber by substantially continuously flowing a temperature-controlled liquid through the chamber in exposed passages isolated from the living organisms and nutrient solution; maintaining a growth-inducing atmosphere in the chamber; and periodically opening the chamber and removing the removable structure through the top thereof for further processing of the living organisms supported thereby.

43 Claims, 18 Drawing Figures

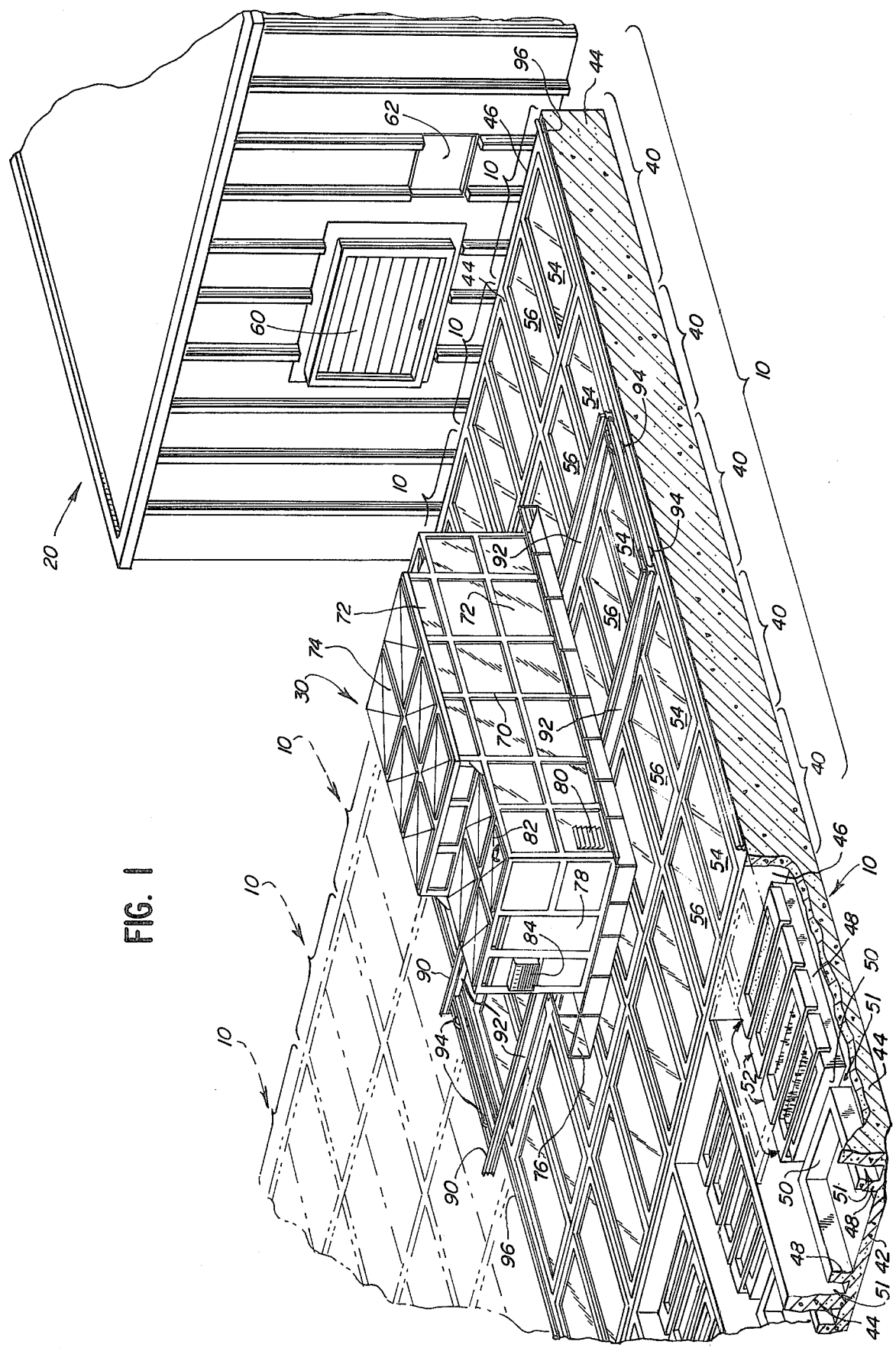

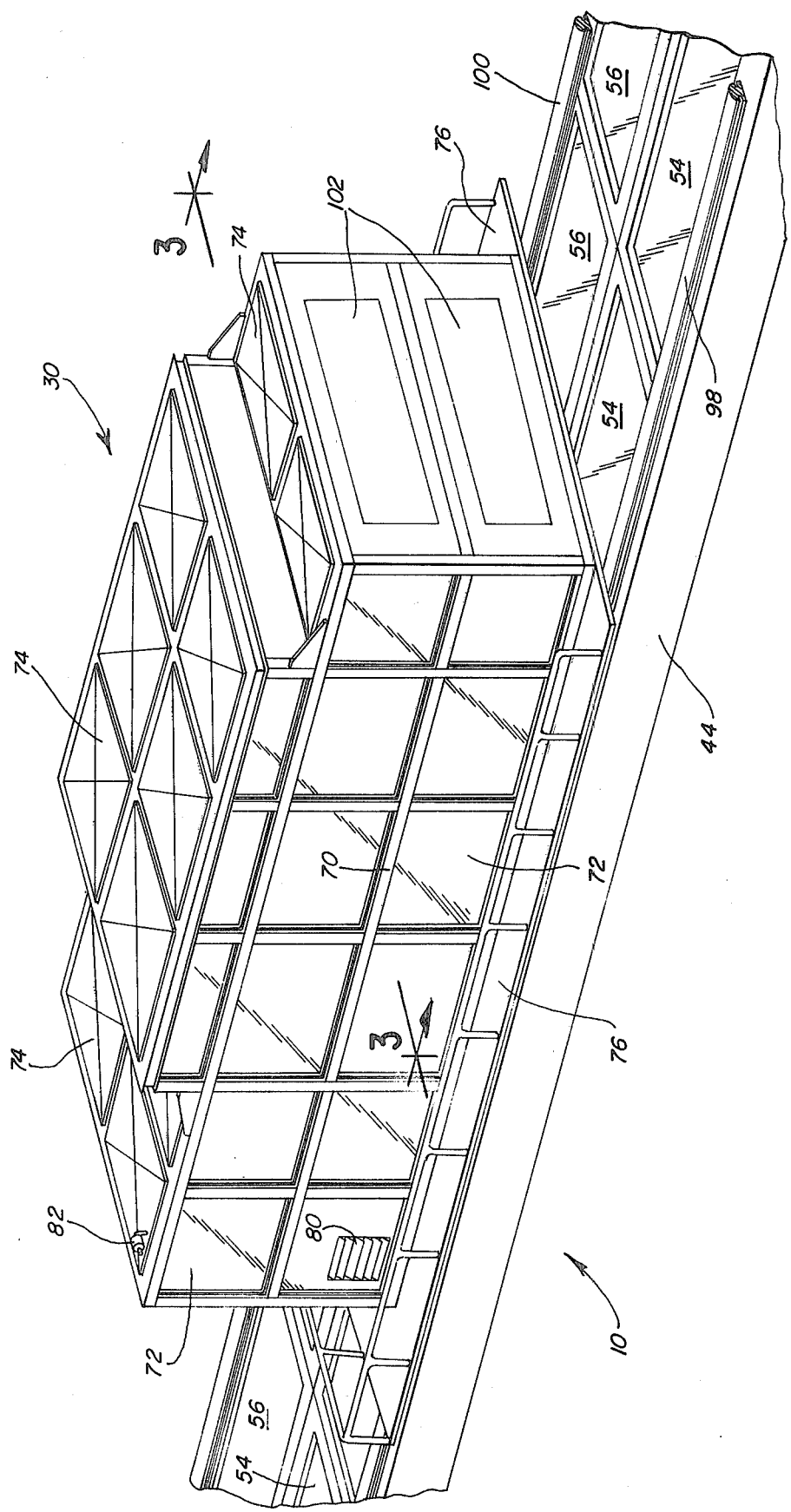

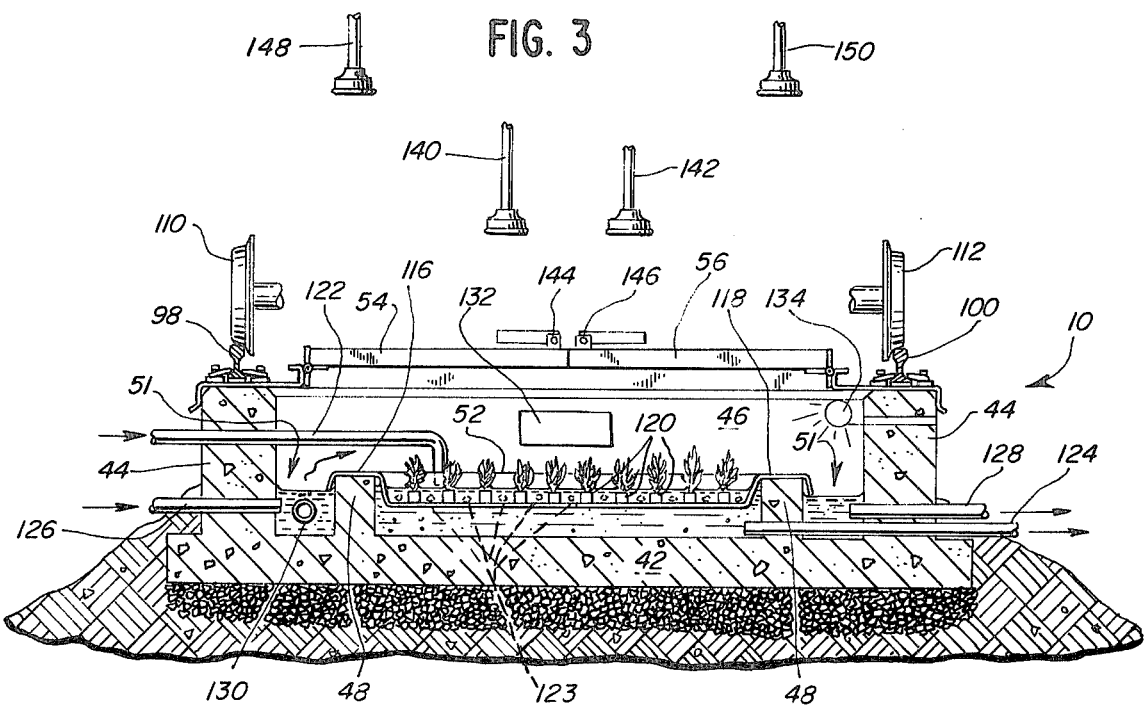
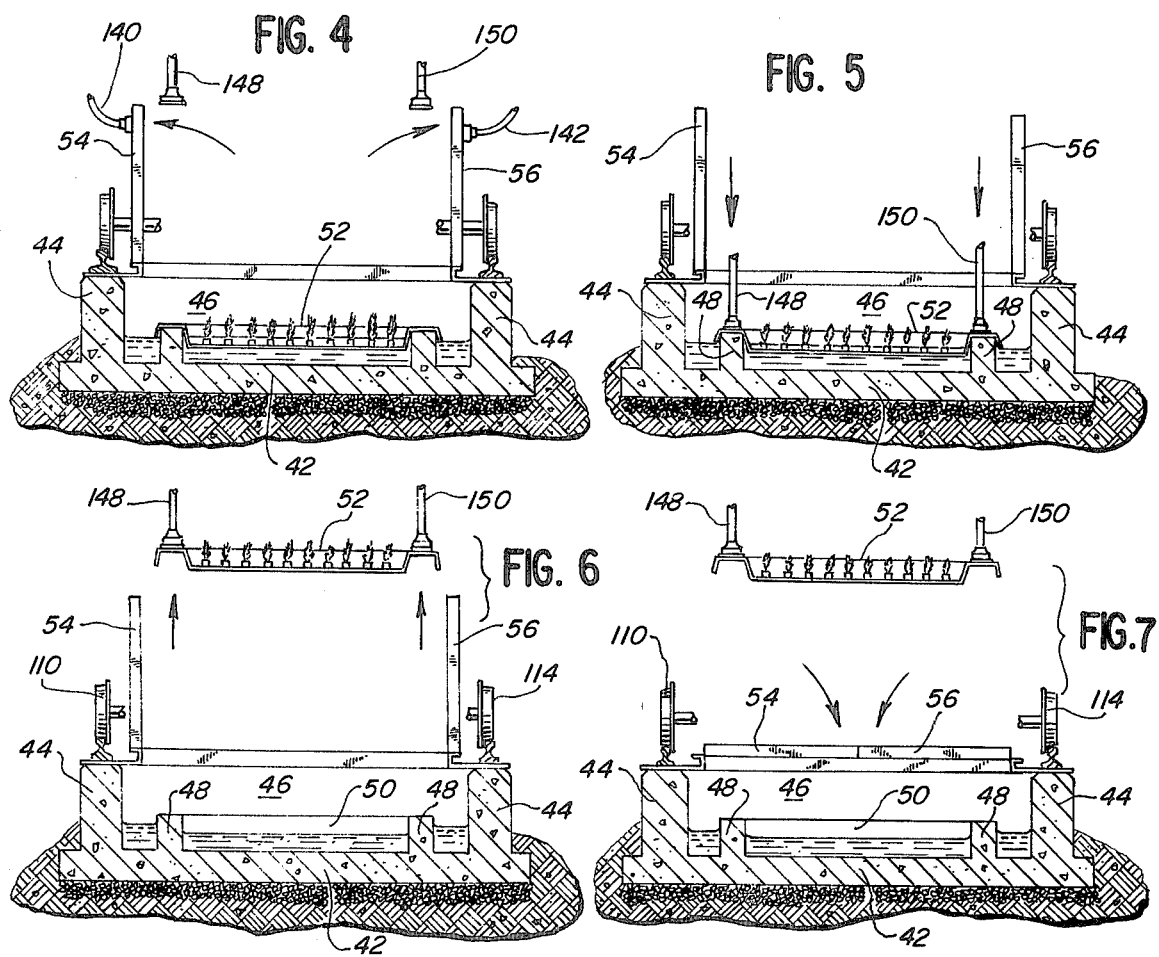

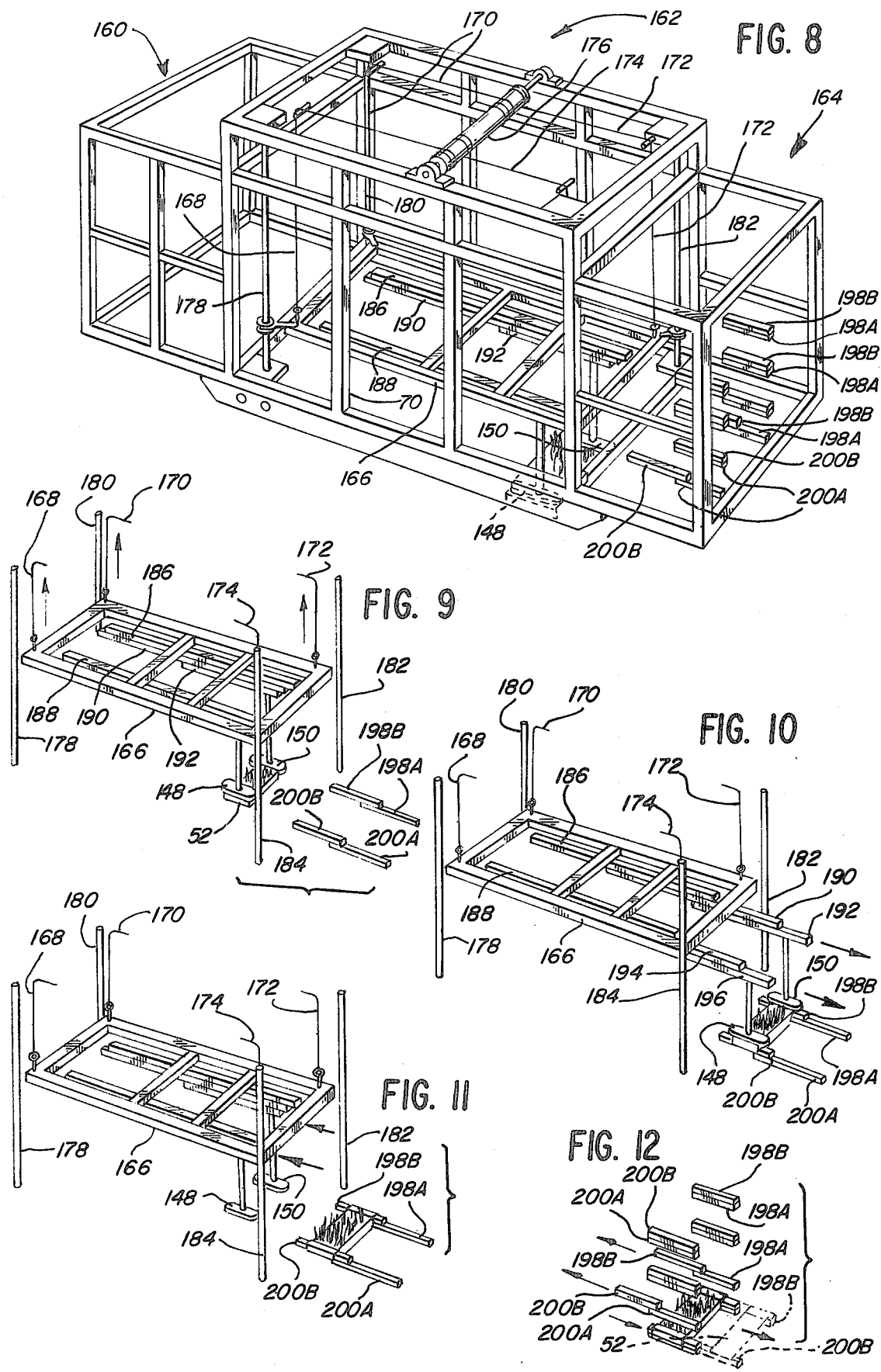

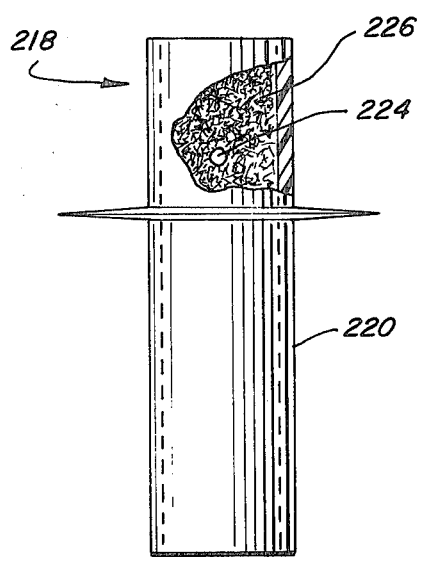
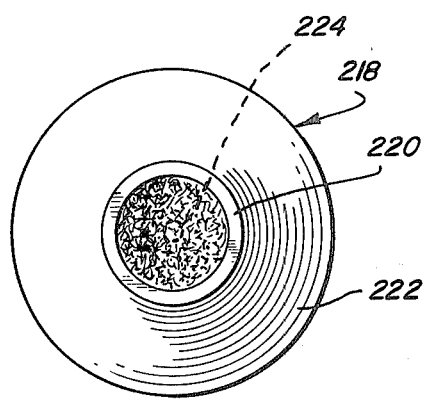
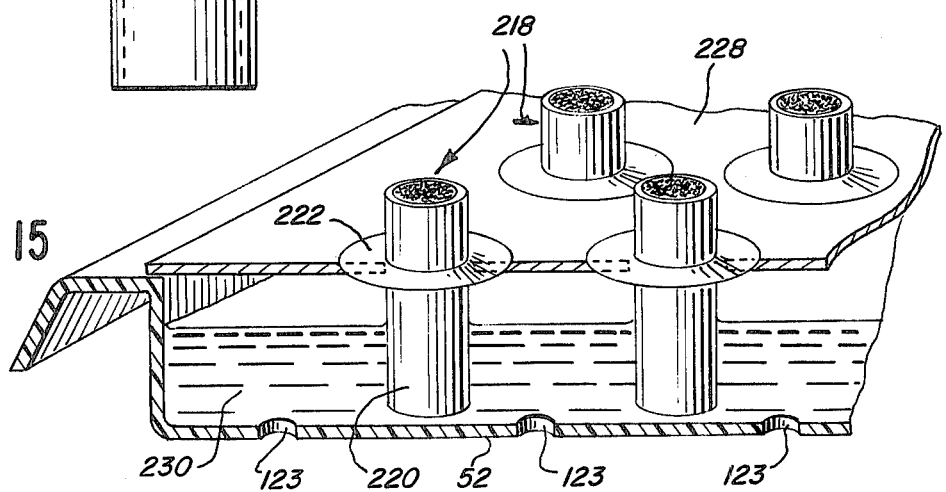
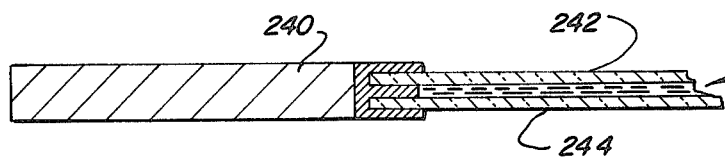
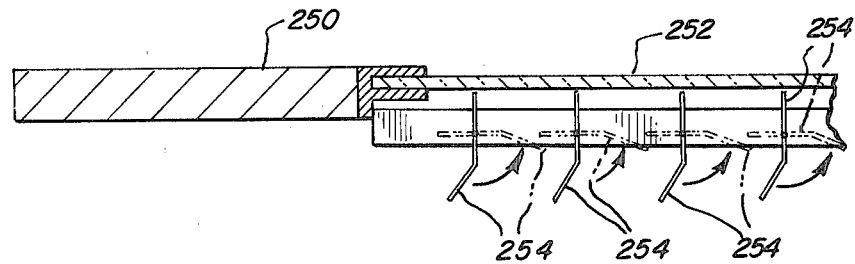

METHOD AND APPARATUS FOR GROWING AND HARVESTING LIVING ORGANISMS

This invention relates to a system, including method and apparatus, for growing living organisms and for harvesting the same. The system is suitable for growing and harvesting plants such as vegetable produce represented by potatoes, carrots, lettuce and the like and is also adaptable for use in connection with the growth and harvesting of animal life, such as shrimp, oysters, and fish cultures, as well as microorganisms including algae, yeast and bacteria. The apparatus has particular utility in the hydroponics industry in which plants are grown in a nutrient solution and where the plant root system is supported in sand, gravel or a plastic foam-like material such as styrofoam, or, in the case of tubulars, a composite granular or particulate medium having both support and requisite compressive characteristics.

BACKGROUND OF THE INVENTION

In the past hydroponics has proven itself to be a viable approach to the production of certain foodstuffs. However, the research that has been applied to hydroponics has basically been in the field of plant pathology and little attention has been made to mechanical problems of commercially growing and harvesting the resulting vegetable product for food purposes.

One of the problems in past practice has involved the environment for hydroponic growth, namely the greenhouse that has been used for the purpose. The greenhouses generally have been designed to accommodate not only the growing plants but also the humans that are required for seeding or planting the hydroponic trays and for harvesting the resulting product. It is estimated that about fifteen percent of the volume of a greenhouse is devoted to plant production while the balance is devoted to the space required by humans in working with the plants that are being grown in the hydroponic system.

An important item that must be taken into account in the commercial operation of the greenhouse structure is the provision of means of access to the greenhouse for planting and harvesting purposes and a practical mechanization of the production facilities. Another important item relates to plant isolation whereby the possibility of contamination of the system during the growth cycle is reduced. A still further item involves environmental control which should be carefully designed to accommodate the optimum environment of the living organisms being grown, i.e., temperatures, exposure to light, gaseous environment, humidity, nutrient replacement, etc.

Thus the design requirements which are important for hydroponics commercial growth include (1) the reduction of the volume of the greenhouse to only that volume required by the plants, (2) the provision of means for ready access to the greenhouse for planting or harvesting purposes, (3) the mechanization of the production facilities, (4) plant isolation, and (5) environmental control during the growth period such as means for regulating temperature, light exposure, carbon dioxide or oxygen concentration in the growing atmosphere, humidity, etc.

An important object of this invention is to provide an apparatus or system which satisfies one or more, and as many as possible, of the foregoing requirements.

GENERAL DESCRIPTION OF THE INVENTION

Process Embodiments

In accordance with one embodiment of the invention a process or method for hydroponically growing living organisms is provided, which method comprises the steps of providing an enclosed, top-openable growing chamber having limited free space and being suitable for receiving a removable structure supporting a multiplicity of the living organisms; exposing the living organisms in the chamber to a growth-inducing nutrient solution for a period sufficient to induce substantial growth in the living organisms under the conditions maintained in the chamber; substantially continuously removing a portion of the nutrient solution from the chamber, restoring the nutrient quality thereof and recycling the restored nutrient solution to the chamber; controlling the temperature within the chamber by substantially continuously flowing a temperature-controlled liquid through the chamber in exposed passages isolated from the living organisms and nutrient solution; maintaining a growth-inducing atmosphere in the chamber; and periodically opening the chamber and removing the removable structure through the top thereof for further processing of the living organisms supported thereby.

In another embodiment, the method includes the step of successively and repeatedly raising and lowering the level of the nutrient solution in the chamber so as to successively and repeatedly emerse and drain the nutrient solution from the living organisms. When growing plant life, a growth-inducing atmosphere in the chamber may typically be maintained by introducing predetermined quantities of carbon dioxide into the chamber and also flowing air therethrough. In such case, the method may also include the step of periodically interrupting the flow of air through the chamber and raising the carbon dioxide content thereof so as to asphyxiate oxygen-dependent organisms, including insects and the like which feed upon plant life and other living organisms.

In a preferred embodiment, the carbon dioxide is introduced into the chamber by sparging the same into the temperature-controlled liquid, the latter typically comprising water. The flowing air may also have controlled, growth-inducing qualities, including predetermined temperature, humidity and/or flow rate.

The method also contemplates the step of periodically or continuously exposing the living organism within the chamber to growth-inducing light, the growth-inducing light being artificial light from a source within the chamber, or natural light, i.e., sunlight, transmitted through light-transmissible portions of the chamber. Both artificial and natural light may be used simultaneously or successively. In a preferred embodiment, the method also includes the step of controlling the level or quantity of growth-inducing light to optimize growth rates. This may be achieved, for example, by varying the intensity of, and/or the time of exposure to, artificial light. In the case of natural light, it may be achieved, for example, by controlling the light transmissivity of the light-transmissible cover portions of the chamber to optimize the growth rate of the living organism.

The various process embodiments lend themselves to computerized process control to optimize the growth function and to maximize economic results. The particular control system depends upon a host of factors, including the living organism being grown, external factors such as geographical location, climatic conditions, the availability and cost of water, heat, electricity, nutrients and the like. For a particular situation, automatic process control is well within the present skill of the art.

Apparatus Embodiments

In accordance with apparatus embodiments of this invention, an apparatus is provided for growing living organisms which comprises a growing unit including a plurality of growing sections having growing trays removably positioned therein, cover means for each section movable to open and closed positions to permit selective removal of the trays from the growing section when the cover means is in the open position. The dimensions and clearances within the growing unit, including the clearance between the grown organism and the closed cover means are minimized to reduce total volume. The apparatus also comprises an enclosed tractor having an opening defined in the bottom thereof movable over the growing unit to position the opening in registry with a selected growing section, means in said tractor for opening or removing and closing or replacing the cover means of a growing section when the bottom opening of the tractor is in registry therewith, means in said tractor for raising the trays from the section through the opening into the interior of the tractor when the covers are in the opened position, and means for permitting movement of the tractor and the raised tray to and from a harvesting and planting location.

The means in the tractor for raising the trays preferably comprises a hoist or elevator which lifts the selected tray vertically, the hoist or elevator also being equipped with one or more horizontally movable sections for transferring a raised tray to a temporary storage area in the tractor. This permits a plurality of trays to be picked up and transported by the tractor to the harvesting and planting location in a single cycle.

In accordance with another embodiment of this invention, an apparatus is provided which comprises an elongated shallow growing unit comprising an elongated vessel or bay having a bottom and side and end walls, a plurality of nutrient-containing, open-top tank sections in said bay having at least peripheral walls inwardly spaced from the bay walls and from one another to form passages for flowing temperature-conditioned fluid around peripheral portions of the sections, means for temperature-conditioning (i.e., heating or cooling) the fluid in the passages, means for circulating nutrient solution through the sections, removable trays in the sections for supporting growing organisms in contact with the solution, cover means for each of said sections to prevent free access of ambient atmosphere to the growing organisms within the sections, and means for separately opening or otherwise removing the cover means from, each of the sections to provide selected access to organisms growing in the corresponding trays for harvesting. Preferably, the elongated shallow growing unit includes a track means for supporting a horizontally-movable harvesting tractor, an embodiment of which is hereinafter described.

In a preferred and economically attractive embodiment, a plurality of elongated shallow growing units is provided in side-by-side orientation, support members for the harvesting tractor transversely spanning the growing units. By movably supporting the tractor on the transverse support members for movement therealong and by movably supporting the support members themselves for longitudinal movement along the growing units, the tractor is movable transversely and longitudinally in a horizontal plane and can be positioned over any section of any unit for access thereto.

The cover means of each section comprises transparent or translucent panels for permitting exposure of the growing plants to an outside source of light during the growth period. Growth rates may be optimized by controlling the light transmissivity of the cover panels. Such control may be achieved, for example, by employing spaced lighttransmissible layers of glass or plastic in the panels with a fluid flowing therebetween, e.g., ethylene glycol, having controlled quantities of an opaque material therein, e.g., carbon black or the like, to vary light transmissivity. Alternatively, controlled shutters responsive to light intensity may be employed on either side or between layers of the light-transmissible cover panels.

An artificial light source having a growth-inducing wavelength may be provided within the growing unit adjacent the underside of the cover panels and above the trays. The intensity and/or exposure time to artificial light may be controlled by conventional techniques and is dependent in part upon the availability, duration and availability of natural light. Light detectors may be employed to control the artificial light source and/or light transmissivity of the cover panels, the input from the light detectors preferably being integrated with other pertinent variables in a central computer control system for determining light exposure.

Means such as pipe distributors or spargers may be provided for introducing carbon dioxide gas to the temperature-conditioned fluid (usually water) in the passages. The carbon dioxide thus introduced bubbles through the fluid and enters the controlled atmosphere to which the living organisms being grown are exposed. In addition to distributing the carbon dioxide effectively by such means of introduction, the technique also slightly acidifies the water and serves to minimize the growth of contaminants therein.

Means may also be provided for adding oxygen gas to the nutrient solution circulated through the sections. This is preferably accomplished in the nutrient recycling system by conventional techniques known to those skilled in the art.

In accordance with a still further embodiment of this invention there is provided a tractor for harvesting living organisms grown in a plurality of spaced growing trays arranged in horizontally disposed relationship in a growing section having openable or removable covers. The tractor, which is contructed to house a human operator and is typically driven by electric motors supplied by an onboard internal-combustion-driven generator, comprises a bottom frame having an opening therein for receiving at least a portion of the covers (when opened or removed) and the selected growing tray, means operating through the opening of said bottom frame for opening or removing and closing or replacing the covers for the growing section, means for lifting the selected tray through said opening into the tractor, and means for moving the tractor containing the lifted tray from the growing location to a harvesting location.

The openable covers are typically hingedly supported on the growing sections and the means in the tractor for opening and closing the doors preferably comprises vacuum grips employing suction for releasably gripping the doors. The means for lifting typically comprises a hoist, e.g , a horizontal frame vertically movable by electrically-driven cables and stabilized by vertical guide rods. Like the door openers, the hoist may include vacuum grips employing suction to releasably secure themselves to horizontal tray edges or extensions for lifting purposes.

As previously stated, the tractor may be provided with a plurality of vertically-spaced storage supports for horizontally receiving a plurality of lifted trays from the hoist and supporting them by engaging edge extensions thereof. These storage supports may be vertically offset from the opening and the hoist so that more than one tray may be lifted, stored and transported to the harvesting location by the tractor. In a preferred embodiment, the hoist includes horizontally-movable, telescopically disposed section or sections for transferring each tray from the hoist proper to one of the plurality of vertically-spaced storage supports. The storage supports may optionally have reciprocating sections to provide clearance or otherwise facilitate the loading or unloading operation. Once the tray is deposited on the storage support, the suction grips are released from the tray and the telescoping or horizontally reciprocating sections and suction grips are retracted into the hoist again.

The ambient conditions, including temperature, humidity and pressure, within the tractor above the bottom opening are maintained compatible with those within the growing units themselves. Accordingly, when the tractor is positioned over a section and the doors of the section opened into the tractor for removal or insertion of a tray, there is no undue disruption of the growing environment within the growing units. Similar precautions exist when the tractor is disposed at the harvesting location for unloading of the trays from the storage area of the tractor or reloading therein of re-seeded trays.

The harvesting location is typically a processing building which is designed so that the tractor unloading door abuts a door therein, one or both doors having a seal or seals which register so as to form an air lock. After the seal is formed, both doors are opened, the trays in the storage area of the tractor are removed to an assembly line in the building for harvesting and packaging. The trays are then cleaned and reseeded. In due course, the reseeded trays are returned to the storage area of the tractor, the tractor is moved to register with a growing section, the doors of the growing section are opened, the trays moved from the offset storage area of the tractor by the hoist and lowered to the growing section, the doors closed, and the growing cycle repeated.

In a particular embodiment, a tray may be removed from the nutrient and stored in the tractor storage area tank for subsequent harvesting and immediately replaced with a reseeded tray from the tractor storage area. Thus the tractor need be positioned over the growing section and the doors opened and closed only once to continue the growing cycle. In still another embodiment, as, for example, when growing strawberries, the trays may be harvested within the tractor and the tray returned to the nutrient tank for continued growth without being transported to, and unloaded into, the harvesting building.

The particular receptacle or medium in which the living organism is to be grown within the tray depends on the nature thereof. In the case of plant life, for example, the seed and subsequent root system may be supported in sand, gravel, peat moss, vermiculite, certain commercial fine aggregates such as Ball growing mix (Ball Corporation product) or the like and admixtures thereof. The seed and root system may also be supported within commerciallyavailable styrofoam seeding cubes, which represents current state of the art devices.

In practicing the method or employing the apparatus of the present invention, as well as in conventional hydroponic systems, it may be advantageous, particularly when growing tubulars, to increase the density of the root supporting medium by employing inert aggregate having a high density. This may be economically accomplished by employing waste bottom ash or slag produced in certain modern commercial coal-burning power plants, particularly those burning nugget coal, and employing combustion techniques producing a relatively inert but relatively dense ash or slag. Typical mineral and screen analyses are as follows:

| MINERAL ANALYSIS | |
| --- | --- |
| Composition | Weight Percent Ignited Basis |
| Silica, $SiO_2$ | 50.53 |
| Alumina, $Al_2O_3$ | 19.00 |
| Titania, $TiO_2$ | 0.77 |
| Ferric oxide, $Fe_2O_3$ | 18.16 |
| Lime, CaO | 7.41 |
| Magnesia, MgO | 1.04 |
| Potassium oxide, $K_2O$ | 1.53 |
| Sodium oxide $Na_2O$ | 0.97 |
| Sulfur trioxide, $SO_3$ | 0.36 |
| Phos. pentoxide, $P_2O_5$ | 0.10 |
| Strontium oxide, SrO | 0.00 |
| Barium oxide, BaO | 0.04 |
| Manganese oxide, $Mn_3O_4$ | 0.09 |
| | 100.00 |

| SCREEN ANALYSIS | | |
| --- | --- | --- |
| Passing Screen | Retained on Screen | Percent |
| | No. 4 | 2.1 |
| No. 4 | No. 8 | 14.6 |
| No. 8 | No. 12 | 24.9 |
| No. 12 | No. 16 | 23.6 |
| No. 16 | No. 20 | 14.4 |
| No. 20 | No. 30 | 9.6 |
| No. 30 | No. 40 | 3.9 |
| No. 40 | No. 60 | 4.4 |
| No. 60 | No. 100 | 1.4 |
| No. 100 | No. 125 | 0.4 |
| No. 125 | No. 175 | 0.3 |
| No. 175 | No. 200 | 0.1 |
| No. 200 | No. 325 | 0.2 |
| No. 325 | | 0.1 |
| | | 100.0 |

The ash may be used by itself or blended with conventional media, e.g., about 10–90 vol. % peat moss and about 90–10 vol. % bottom ash; about 25–75 vol. % Ball growing mix and about 75–25 vol. % bottom ash, etc. The proportions will depend in part upon the particular plant life being grown.

Another advantageous seed and root system support device which may advantageously be employed in practicing the present invention is a seeding thimble comprising a cylindrical tube with an enlarged radially-extending exterior collar intermediate the extremities thereof, the hollow core of the cylinder being loosely packed with a porous wadding in which the seed is initially imbedded. The thimble typically comprises injection molded plastic, e.g., polyethylene, polypropylene, polystyrene or the like.

The thimble is inserted vertically into an aperture in a support cover on the tray, the collar being larger than the aperture whereby the thimble is vertically disposed with the lower extremity, including the wadding immersed in the nutrient solution. While the seed is disposed within the thimble above the nutrient level, it is wetted thereby due to the absorption and capillary action of the wadding. The wadding typically comprises paper, preferably biodegradable, cotton, nylon, plastic or the like, the particular material, density of packing thereof and the like depending upon the requirements of the plant life being grown. While the thimble and its collar are preferably cylindrical for ease of manufacture, other configurations, such as square, rectangular or triangular cross sections, may also be employed, as those skilled in the art will recognize in the light of the present disclosure.

BRIEF DESCRIPTION OF THE DRAWINGS

The present invention will be more clearly understood from the following detailed description of specific embodiments, read in conjunction with accompanying drawings, wherein:

FIG. 1 is an over-all partially-cutaway perspective view of an embodiment showing a plurality of growing units or bays in side-by-side relationship, the associated tractor and the seeding and harvesting building, a still further aggregation of growing units to achieve economies of scale being illustrated in phantom lines;

FIG. 2 is a fragmentary perspective view of an experimental embodiment similar to FIG. 1 except that it features only a single growing unit, and the associated tractor;

FIG. 3 is a fragmentary sectional view taken along the line 3—3 of FIG. 2 and schematically shows a growing unit in the normal closed position with tractor portions stationed over one of the nutrient tanks therein;

FIGS. 4–7 are similar to the fragmentary section view of FIG. 3 on a reduced scale and schematically show the successive steps of unloading a tray from the nutrient tank of a growing unit into the tractor;

FIG. 8 shows the skeleton or framework of the tractor to facilitate illustration of the system therein for hoisting or elevating trays from a nutrient tank and storing it in the storage area of the tractor;

FIGS. 9–12 are similar to FIG. 8 on a reduced scale and schematically illustrate the steps of employing the hoist system;

FIGS. 13 and 14 are cutaway elevation and plan views, respectively, of a preferred embodiment of a seeding thimble advantageously used in the practice of the present invention;

FIG. 15 is a cutaway perspective view of a plurality of seeding thimbles of the type shown in FIGS. 13 and 14 supported in a growing tray so as to be partially immersed in the nutrient solution;

FIG. 16 is a fragmentary sectional view of an edge of a cover showing spaced panes with a fluid medium therebetween capable of varying light transmissivity;

FIG. 17 is a similar fragmentary sectional view of a cover wherein the light transmissivity through the transparent portion of the cover is controlled by the positioning of shutters.

Figure 18:
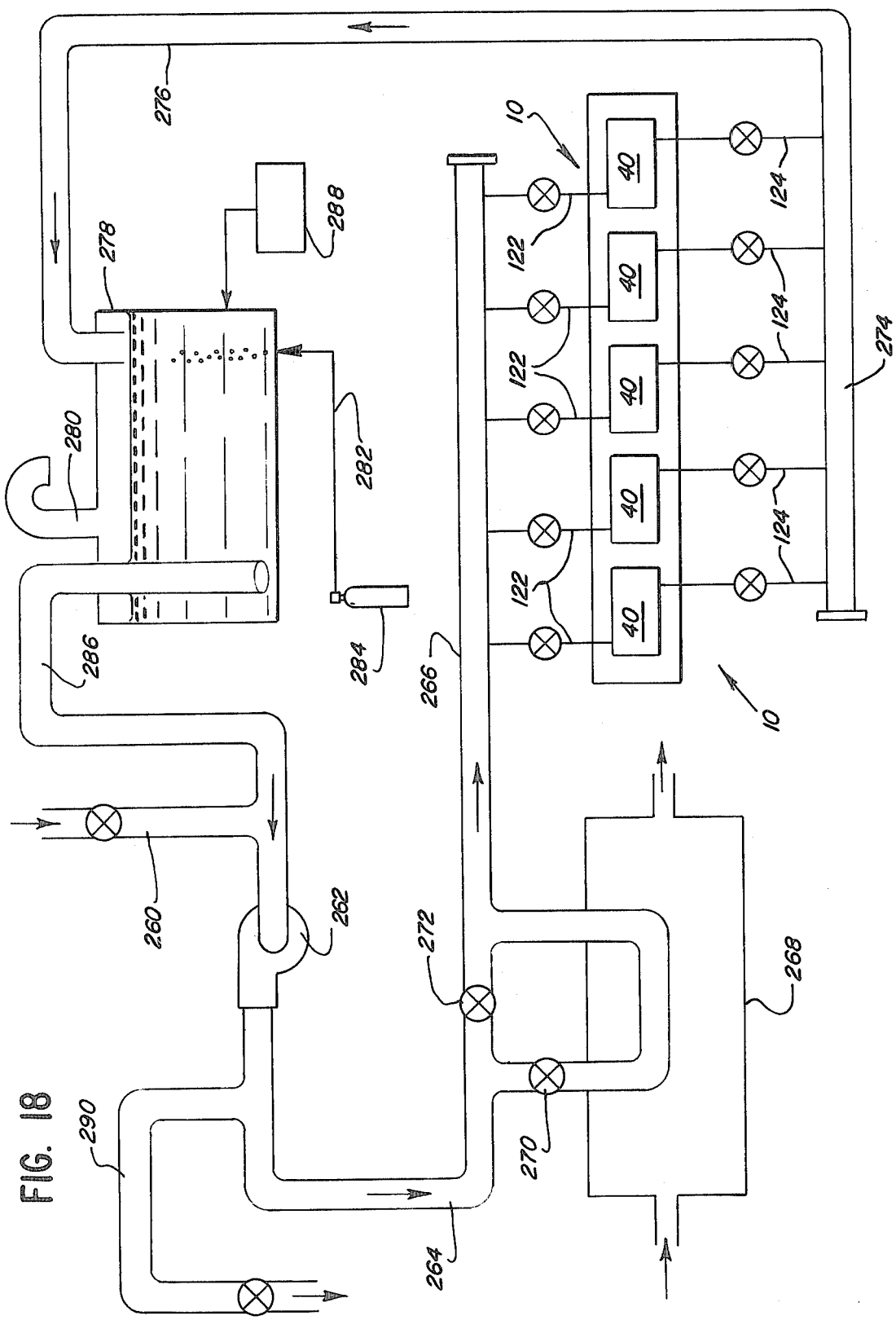
FIG. 18 is a schematic flow diagram illustrating the recirculation system for maintaining nutrient solution in the nutrient tank of each growing section of the growing unit.

It should be understood that these drawings are diagrammatic or schematic and graphic symbols are employed therein and that the drawings are not necessarily to scale. While much mechanical detail has thus been omitted, such detail is not per se part of the present invention and is considered well within the skill of the mechanical arts in the light of the present disclosure. The resulting simplified presentation is believed to be more readable and informative and readily understandable by those skilled in the art. It should also be understood, of course, that the invention is not limited to the particular embodiment illustrated.

DETAILED DESCRIPTION OF THE DRAWINGS

The Over-all System

Referring to FIG. 1, the apparatus of the illustrated embodiment of the present invention comprises side-by-side growing units or bays 10, seeding and harvesting building 20 and movable tractor means 30. Excluding the cutaway and phantom line portions of FIG. 1, there are four side-by-side growing units 10 illustrated. Each of growing units 10 includes five covered growing tanks or sections 40 arranged generally in longitudinal alignment, the number of growing sections 40 per unit 10 being a matter of design expediency. By employing a multiplicity of contiguous growing units or bays, sharing common walls where possible, economies of scale may be achieved, as illustrated, and as further suggested by the phantom lines.

The Growing Unit

Each growing unit 10 comprises a base 42, longitudinal side walls 44, and transverse end walls 46. The growing sections within each growing unit 10 are best illustrated in the cutaway section at the lower left of FIG. 1. Each of the growing sections 40 comprises side walls 48, which are lower than and spaced from side wall 44, and end walls 50, which are spaced from adjacent end walls 50 and end wall 46. Employing the same bottom as that of the growing unit, an economical nutrient reservoir or tank is thereby formed with surrounding but separate and isolated channels 51 for circulation of temperature-conditioned liquid, e.g., water, which is in heat-exchange relationship with the atmosphere and nutrient solution.

Advantageously, base 42, side walls 44 and end walls 46 of the growing units 10, and side walls 48 and end walls 50 of each of the growing sections 40 are integrally constructed of poured concrete, the composition of which is substantially free of deleterious ingredients harmful to the living organism being grown. Alternatively, the concrete, particularly that forming the nutrient tank, may be appropriately coated to seal or otherwise isolate the nutrient solution from the concrete or for other purposes. While the nutrient tanks in the illustrated embodiment are integrally formed as part of the growing unit and share a common bottom, the tanks may, of course, be separately constructed and suspended within the growing unit. In the latter embodiment, the temperature-conditioned fluid may circulate beneath as well as around the nutrient tank.

Each growing section 40 supports a plurality of removable growing trays 52 disposed transversely thereacross. In the cutaway portion of FIG. 1, four trays 52 per growing section are employed. Each growing section 40 also has a pair of center opening doors 54 and 56 associated therewith whereby trays 52 may be put in place in the nutrient tank or removed therefrom by tractor means 30.

Seeding and Harvesting Building

Seeding and harvesting building 20 includes normally-closed passageway 60 and observation window 62. When the tractor is position so that the frame of passageway 60 registers and abuts with the storage area passageway of tractor 30 (illustrated in FIG. 2), an air lock is formed. Thus, when the respective passageways are opened, the desired environmental conditions are maintained within both the building and tractor during loading and unloading operations.

The Tractor

Referring to FIGS. 1 and 2 together, tractor 30 houses three sections or areas. In general, the left section is the operator-control area, the middle or upraised section is the elevator or hoist area, and the right section is the storage and loading and unloading area.

Tractor 30 comprises framework 70 which is enclosed on the sides with plexiglass panes 72, the latter preferably being selected so as to enhance the environment within the tractor by passing desired wavelengths of light. The top of the tractor is enclosed by ceiling pans 74, which may be water-filled for cooling purposes. Closeable vents and blower means may also be employed to control the internal environment of the tractor. As above indicated, the outer or left section of the tractor as viewed in FIGS. 1 and 2 houses the operator, control means, power supply, etc. The operator may enter from catwalk 76 through door 78.

Tractor 30 is preferably driven by electric motors, the power therefor and for other electrically powered functions and controls being supplied by current from an internally-housed generator, preferably driven by an on-board internal combustion engine, e.g., a gasoline powered engine. The generator is vented via generator vent 80, and the engine exhaust exits via exhaust stack and muffler 82. To prevent undue buildup of temperature within the operator control area, the air is cooled therein by means of onboard, electrically-powered air conditioner 84.

In FIG. 1, tractor 30 is mounted for powered bidimensional horizontal movement relative to the growing bays, as is contemplated in the commercial practice of the present invention. For such purposes, tractor 30 is mounted over the growing bays on steel flanged wheels (not shown) which mate with rails 90 which are supported on top of transverse I-beams 92. Electric motors drive one or more of the flanged wheels or other motive system. Thus, tractor 30 may be driven along rails 90 transverse the growing bays so as to be aligned with any selected bay.

Transverse I-beams 92 are in turn part of a generally-rectangular, powered, movable structure supported by similar steel flanged wheels 94, which in turn mate with longitudinal rails 96 on top of outer walls 44. One or more of wheels 94 are electrically driven, whereby longitudinal movement is imparted to the supporting I-beams 92 and thereby tractor 30. Rack and pinion gear drives or other drives may also be employed. The combination of transverse movement on rails 90 and longitudinal movement on rails 96 impart the desired two-dimensional horizontal movement of the tractor, whereby it may be positioned over the center opening doors of any selected growing section 40 of any growing unit 10. Likewise, the tractor can be readily positioned abutting passageway 60 of seeding and harvesting building 20 for loading and unloading.

The control means for the system includes braking control devices for the automatic and precise positioning of the tractor over the selected growing section to be harvested. This assures that the bottom opening of the tractor and the doors of the growing section are in proper registry for the subsequent door opening operation. Similarly, the control system automatically positions the tray gripping shoes of the tractor over the selected tray to be harvested, as further described hereinafter.

In the experimental single bay embodiment of FIG. 2, the tractor need move only in one direction. Accordingly, the flanged wheels thereof are mounted for longitudinal movement along rails 98 and 100 on top of wall 44. Thus, the tractor may be moved over any selected one of the growing sections or tanks or to the seeding and harvesting building located at the right of FIG. 2 (not shown).

The storage area in the right-hand section of tractor 30 as viewed in FIG. 2 is loaded with trays removed from the growing sections, or loaded with reseeded trays from the harvesting building, or a combination thereof whereby a tray with grown organisms for harvesting may be removed from the nutrient tank of a growing section and stored, and a reseeded tray put in place in the nutrient tank in a single uninterrupted operation.

The storage area communicates with the havesting building via doors 98. As previously mentioned, when the tractor abuts the harvesting building, an air lock is formed whereby the environmental conditions are not disturbed.

The Growing Section In Detail

Referring to the schematic of FIG. 3, the tractor (not shown) is supported by a wheeled structure 110 and 112 on rails 98 and 100 along side walls 44 of growing bay 10. The tractor has a bottom opening therein which when in registry with a selected growing section and nutrient tank, permits hinged doors 54 and 56 to be substantially fully opened so that one or more of the growing trays 52 may be removed therefrom.

FIG. 3 also illustrates schematically details of a growing section. Extended edge portions 116 and 118 of growing tray 52 are supported on side walls 48. A multiplicity of living organisms, e.g., plant life, are supported by conventional means such as styrofoam cubes 120 within growing tray 52. A nutrient solution formulated to enhance the growth of the living organism is supplied via inlet pipe 122. It enters the nutrient tank and flows into the growing tray through multiple apertures 123 in the sides and bottom of the tray to a level sufficient to optimize the growth of the particular organism supported by styrofoam cubes 120.

The nutrient solution is removed from the nutrient tray via outlet pipe 124 for enhancement in conventional facilities such as shown in FIG. 7 (hereinafter described) at a rate consistent with the input flow from pipe 122 and sufficient to maintain desired nutrient liquid levels and optimum growing conditions within the growing section. The enhancement of the nutrient solution may include the addition of concentrated liquid additives and oxygen by conventional techniques such as, for example, bubbling oxygen, oxygenrich air or air therethrough.

For certain plant life, repeated intermittent exposure to the nutrient solution may be desired. This is readily accomplished by controlling the respective input and output rates of the nutrient solution to and from the nutrient tank via pipes 122 and 124 so as to successively raise and lower the level of the nutrient solution in the nutrient tank.

The temperature within the growing section and bay is controlled by introducing temperature-controlled liquid, such as warm water, via inlet pipe 126 into channels 51 surrounding, and in heat transfer relationship with, the internal atmosphere, the nutrient tank, the nutrient solution and the removable growing trays. The temperature-controlled liquid is exhausted from the growing bay via outlet pipe 128. A particularly advantageous aspect of the present system is that where the growing bays need to be heated to optimize growth rates, waste hot water from industrial sources may economically be used for such purposes, such as that available from nuclear or fossil-fueled power plants. The waste water may be used directly, diluted for temperature control purposes, if necessary, or heat exchanged with another liquid which is used for such purposes. While nutrient inlet pipe 122 appears to be in a path of removal of the tray 52, it should be recognized that it is shown schematically and it is actually displaced so as not to obstruct the same. Likewise, it should be recognized that the various inlet and outlet pipes may be disposed at offset locations along the growing bay or at opposite ends thereof. Moreover, a plurality of same may be employed.

The atmosphere within the bay may also be controlled to enhance growth. Thus, in the case of plant life, for example, carbon dioxide content of the atmosphere in the growing bay may be controlled by introducing gaseous carbon dioxide at a preselected rate through sparger pipe 130. The pipe is emersed below the surface of the temperature-controlled liquid and has a plurality of perforations or other outlets therealong whereby the exiting carbon dioxide bubbles out and is substantially uniformly distributed along the growing bay. As aforementioned, introducing the carbon dioxide below the liquid level, in the case of water, acidifies the water mildly whereby the growth of undesired contaminants such as algae and the like may be inhibited.

Air may be introduced into the growing bay via aperture 132 in wall 46, by means of blowers, suction fans or the like. The air may be conditioned in terms of temperature, humidity, or the like and the flow rate may be adjusted, consistent with other variables, to optimize growth rates. Exhaust air may be removed via a similar aperture in the opposing end wall. The air inlet and outlet apertures may, of course, be located in the side walls at offset locations, the exact location being the matter of design expediency and economy.

An advantageous aspect of the present method and apparatus is the ability to readily control and change the atmosphere within the growing bay. Thus, for example, to purge the growing bay of oxygen-dependent organisms, including insects and other pests, the method of the present invention contemplates the periodic cessation of air input and the buildup of the carbon dioxide content of the atmosphere via the sparger pipes so as to asphyxiate the undesired organisms.

Growth-enhancing artificial light may be introduced by means of light fixture 134 having suitable spectrum of wavelengths. Similar light fixtures may be located on the other side of the growing section or at other locations within the growing bay to obtain the desired intensity. The intensity and time period of the lighting may be controlled depending upon the needs of the growing organism and the availability and intensity and duration of natural light, and the like. Conventional automatic control techniques for such purposes are available and are well known to those skilled in the art.

Tray Removal Into Tractor Storage

When the living organisms have grown sufficiently so as to be ready for harvesting, the tractor is positioned over the growing section of a nutrient tank whereby the bottom opening in the tractor registers with doors 54 and 56. Means for opening the doors are then lowered from the tractor, and the doors opened to a substantially erect or vertical position. Because the distance between the bottom opening of the tractor and doors 54 and 56 when closed is minimized, and the doors hingedly swing up into the bottom opening of the tractor when opened, and the environment within the tractor is maintained so as not to be inconsistent with that in the growing section, a substantially closed and optimized system is achieved. The air lock system between the tractor and seeding and harvesting building assists in maintaining the desired closed system.

The means for opening doors 54 and 56 may be conventional. It may comprise, for example, suction grips 140 and 142 operated from a vacuum system within the tractor (not shown). Alternatively, mechanical techniques may also be employed such as, for example, mechanically attaching retractors to upraised eyelets 144 and 146 adjacent the door edges at the center.

Referring to FIGS. 4-7, once doors 54 and 56 are raised to a substantially upright position, suction shoes 148 and 150 on the hoist structure of the tractor are lowered so as to engage the outer edge margins or edge extensions 116 and 118 of tray 52 and elevate the same from the nutrient tank. Because of the substantial weight of the filled tray, suction shoes 148 and 150 preferably extend substantially the entire length and width of the edge extensions and typically may each have a gripping area of 30 to 200 square inches. The lifted tray is then stored in the storage area of the tractor to be described hereinafter, and the doors are lowered so that the tractor may then be moved to another position or to the harvesting building.

Referring to FIG. 8, the frame of the tractor outlines the aforementioned operator and control area at 160 on the left, the elevator or hoist area 162 in the center, and the storage area 164 at the right. Hoist frame 166 which supports suction shoes 148 and 150 is raised and lowered at its four corners by cables 168, 170, 172 and 174 which are attached to driven take-up drum 176. The position of hoist frame 166 is controlled by means of vertical guideposts and collar assemblies 178, 180, 182 and 184 at the four corners (guidepost and collar assembly 184 being hidden in FIG. 8).

Suction shoes 148 and 150 are supported on hoist frame 166 by stationary longitudinal support members 186 and 188, each of which has two reciprocating or telescoping members, 190 and 192 and 194 and 196, respectively (the latter shown in FIG. 10), from which suction shoes 148 and 150 are suspended. After the tray is picked up by the shoes 148 and 150 and elevated into the tractor interior, reciprocating members 190, 192, 194 and 196 permit shoes 148 and 150 to move the tray into storage area 164.

Storage area 164 includes a plurality of verticallydisposed tray edge supports 198 (A and B) and 200 (A and B), which are vertically and horizontally spaced so as to receive a plurality of growing trays for storage one above the other. Each of tray edge supports comprises a fixed lower support, i.e., 198A and 200A. and a movable upper support, i.e., 198B and 200B, to provide clearance and facilitate loading and unloading.

Referring to FIGS. 9 through 12, reciprocating members 190 and 192 on fixed member 186, and 194 and 196 on fixed member 188, are positioned so that shoes 148 and 150 can be lowered to grip the tray edges of tray 52. The tray is then lifted from the nutrient tank, as depicted in FIG. 9. By reciprocally extending members 190, 192, 194 and 196, the tray may then be deposited on extended movable supports 198B and 200B, as depicted in FIG. 10.

When the tray is deposited on supports 198B and 200B, suction is released and extensions 190, 192, 194 and 196 are retracted within the hoist, as depicted in FIG. 11. The movable support extensions 198B and 200B may then be retracted to register with fixed supports 198A and 200A, as depicted in FIG. 12.

The movable portions 198B and 200B of the tray supports permit a series of trays to be deposited, stored and removed without interference. Thus, with the lower support loaded with a tray and in the stored position, the movable portions 198B and 200B of the tray above may be extended to the left to receive another tray, also as depicted in FIG. 12. Manifestly, movable support members 198B and 200B may also be designed to reciprocate in the right-hand direction, as viewed in FIGS. 8-12, so as to also extend into the harvesting building for tray removal or tray replacement. Rack and pinion gear type drives or mechanical equivalents or alternatives for moving the various reciprocating elements may be employed, as those skilled in the art will recognize.

Growth Media And Seed Thimble

Seeds and growing root systems may be supported in the growing trays 52 in conventional media, including plastic foam cubes. Alternatively, the growth media may comprise the inert furnace slag particulate disclosed hereinabove, alone or in combination with other growth media.

Referring to FIGS. 13-14, a still further seed and root support system may be employed in the practice of the present invention. The seed thimble 218 comprises hollow plastic cylinder 220 with cylindrical support collar 222. Seed 224 is supported therein by means of porous wadding 226, the characteristics of the wadding, the density and packing thereof being selected to provide the desired contact of the seed and the root system developing therefrom with the nutrient solution.

Referring to FIG. 15, a plurality of thimbles 218 are supported within apertured nutrient tray 52 by means of apertured tray cover 228. The length of cylinder 220, and the position of collar 222 is coordinated whereby the wadding 226 is adequately immersed in the nutrient solution 230 so as to adequately wet the seed 224 and the root system to be grown therefrom. In a particular embodiment, the position of collar 222 is adjustable along cylinder 220, preferably by employing a friction fit. For a given purpose, however, cylinder 220 and collar 222 are preferably integrally injectionmolded to form an inexpensive one-piece thimble.

As previously indicated, the level of nutrient solution 230 may be adjusted to achieve desired contact. As also previously indicated, an embodiment of the present invention contemplates that nutrient solution 230 may be raised and lowered periodically or cyclically to obtain optimum periodic contacting with certain types of the living organisms, irrespective of whether they are supported in the particular seed thimble of FIGS. 12-14.

Optimized Lighting

Various means may be employed to vary the light transmissivity of the transparent or translucent portions of the doors or covers on the growing sections. Referring to FIG. 16, for example, the door or cover edge 240 of a growing section supports spaced transparent or translucent panes 242 and 244 whereby a fluid medium 246 may be circulated therebetween. The light-transmissivity of the double panes may thus be adjusted by controlling the characteristics of the fluid 246. In a specific embodiment, fluid 246 comprises ethylene glycol having varying amounts of carbon black therein, the greater the amount of carbon black the less the light transmissivity.

Referring to FIG. 17, door or cover edge 250 supports a transparent or translucent pane 252 having underneath controlled shutters 254. The positioning determines the light transmissivity of the door and may be automatically controlled.

Manifestly, a light detector within the growing bay may be employed to control the fluid medium of the embodiment of FIG. 16 or the positions of the shutters in the embodiment of FIG. 17. Such control mechanisms are well within the skill of the art.

Nutrient Solution Recycle

One feature of the present invention is the provision of means for continuously or intermittently recycling nutrient solution from the nutrient tanks and growing trays of the growing sections 40. One such means is schematically illustrated in FIG. 18.

As depicted, fresh nutrient solution is introduced into the system through valved conduit 260, pump 262, conduit 264, a valved manifold line 266 and individually valved lines 122, which supply each growing section 40 of growing unit 10. A heat exchanger 268 may be interposed between the lines 264 and the nutrient manifold line 266 by opening and closing valves 270 and 272, respectively, in order to control the temperature of the nutrient solution passing into the individual growing sections. The heat transfer medium for the heat exchanger 268 may be cooling water from a deep well or heat from any suitable source such as waste heat from an industrial plant, geothermal heat or waste heat from a power plant. Suitable float valves or detectors (not shown) may be employed to control the level of the nutrient solution in the nutrient tanks of the growing sections 40 of the growing unit 10.

The nutrient solution may be continuously or intermittently withdrawn from the nutrient tanks through drain lines 124 and a main drain manifold 274, from which it is passed via line 276 to a nutrient storage and enhancement tank 278 suitably buried in the ground near the growing unit, preferably below the frost line to prevent freezing in winter. The nutrient tank 278 is provided with a vent 280 and a line 282 for introducing oxygen or other gas from a source 284 for addition to the nutrient, which is recycled to the system through conduit 286. Additional liquid nutrients or other additions may also be added, as required, from supply 288. A valved drain line 290 is provided for removing nutrient solution from the system. This drain line may optionally be located in lines 276 or 286.

It will, of course, be appreciated that the several valves in the recycle system may be remotely controlled by the operator and operated to supply or withdraw nutrient solution from the nutrient tanks in any desired sequence or as may be required during the growth or harvesting cycles.

The system for supplying temperature-conditioned (heated or cooled) water to the channels surrounding the nutrient tanks is well within the skill of the art. It advantageously employs well water for cooling or heated waste water from industrial or power plants for heating, directly or via heat exchangers, as previously described. Flow rates and levels are controlled by conventional techniques.

Automatic System Control

The method and apparatus in certain embodiments contemplate the balancing of a number of growth variables to optimize the growth rate of the living organisms to be harvested. These variables include the characteristics of the particular organism, quality and flow rates of the nutrient solution, temperature of the growing bay, lighting (natural and artificial), atmosphere therein (e.g., carbon dioxide content, air quality and flow, etc.), and the like. The method and apparatus of the present invention lends itself to computerized control of these variables to achieve desired results, as those skilled in the art will recognize. In those instances where the optimum balance of the numerous variables for a given organism is not already known, computerized control of the method and apparatus of the present invention assists in determining such optimum balance empirically.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. The method of growing living organisms comprising the steps of:
   (a) providing an enclosed, top-openable chamber having limited free space and receiving a removable structure supporting a multiplicity of the living organisms;
   (b) exposing the living organisms in said chamber to a growth-inducing nutrient solution for a period sufficient to induce substantial growth in said living organisms under the conditions maintained in said chamber;
   (c) substantially continuously removing a portion of said nutrient solution from said chamber, restoring the nutrient quality thereof and recycling the restored nutrient solution to said chamber;
   (d) controlling the temperature within said chamber by substantially continuously flowing a temperature-controlled liquid through said chamber in exposed passages in heat exchange relationship with, but isolated from, said living organisms and nutrient solution; and
   (e) periodically opening said chamber and removing said removable structure through the top thereof for further processing of the living organisms supported thereby.

2. The method of claim 1 including the step of successively and repeatedly raising and lowering the level of said nutrient solution in said chamber so as to successively and repeatedly emerse and drain the nutrient solution from said living organisms.

3. The method of claim 1 including the step of maintaining a growth-inducing atmosphere in said chamber.

4. The method of claim 3 wherein the growth-inducing atmosphere in the chamber is maintained by introducing predetermined quantities of carbon dioxide into said chamber and flowing air therethrough.

5. The method of claim 4 including the step of periodically interrupting the flow of air through said chamber and raising the carbon dioxide content thereof so as to asphyxiate oxygen-dependent organisms.

6. The method of claim 4 wherein carbon dioxide is introduced into said chamber by sparging the same into said temperature-controlled liquid, and said temperature-controlled liquid comprises water.

7. The method of claim 4 wherein the flowing air has a predetermined temperature, humidity and flow rate.

8. The method of claim 1 including the step of exposing the living organism within the chamber to growth-inducing light.

9. The method of claim 8 wherein the growth-inducing light is artificial light from a source within said chamber.

10. The method of claim 8 wherein the growthinducing light is sunlight transmitted through light-transmissible portions of said chamber.

11. The method of claim 10 including the step of controlling the light transmissivity of the light-transmissible portions of said chamber to optimize growth of the living organism.

12. The method of growing living organisms comprising the steps of:
   (a) providing an enclosed, top-openable chamber having light-transmissible top portions and limited interior free space, the chamber being suitable for receiving a multiplicity of the living organisms supported on a removable structure;
   (b) exposing the living organisms in said chamber to growth-inducing light;
   (c) exposing the living organisms in said chamber to a growth-inducing nutrient solution for a period sufficient to induce substantial growth in said living organisms under the conditions maintained in said chamber;
   (d) substantially continuously removing a used portion of said nutrient solution from said chamber and recycling the same to the chamber after restoring the nutrient quality thereof;
   (e) maintaining a growth-inducing atmosphere in said chamber by flowing air therethrough;
   (f) controlling the temperature within said chamber by substantially continuously flowing temperature-controlled water through the chamber in exposed passageways isolated from, but in heat exchange relationship with, said growth-inducing atmosphere and said nutrient solution;
   (g) introducing predetermined quantities of carbon dioxide into said chamber by sparging the same into said temperature-controlled water; and periodically opening said chamber and removing said removable structure through the top thereof for further processing of the living organisms supported thereby.

13. The method of claim 12 wherein the growth-inducing light is sunlight transmitted through the light-transmissible portions of said chamber.

14. The method of claim 12 wherein the growthinducing light is artificial light from a source within said chamber.

15. The method of claim 12 including the step of successively raising and lowering the level of said nutrient solution in said chamber so as to successively and repeatedly emerse and drain the nutrient solution form said living organisms.

16. The method of claim 12 including the step of periodically interrupting the flow of air through said chamber and raising the carbon dioxide content thereof so as to asphyxiate oxygen-dependent organisms.

17. An apparatus for growing living organisms comprising:
(a) a growing unit including a plurality of individual growing sections having trays for the growing living organisms removably positioned therein;
(b) a cover means for each section movable to opened and closed positions to permit selective removal of the trays from the section when the cover means is in the open position;
(c) an enclosed tractor having an opening in the bottom thereof movable over said growing unit to position said opening in registry with selected growing sections;
(d) means in said tractor for opening and closing the cover means of a growing section when the bottom opening of the tractor is in registry therewith;
(e) means in said tractor for raising said trays from said section through said opening into the interior of said tractor when the covers are in the opened position; and
(f) means for permitting movement of said tractor and a raised tray to and from a harvesting and planting location.

18. The apparatus of claim 17 in which the growing unit comprises an elongated vessel having a bottom section and upwardly extending side walls, said walls including a track means for movably supporting the tractor.

19. The apparatus of claim 18 in which the cover means for the section is hingedly mounted on an upper portion of at least one of the side walls.

20. The apparatus of claim 17 in which the tractor includes a mechanism for engaging said cover means and moving it at least partially through the bottom opening to said opened position.

21. The apparatus of claim 17 in which the tray raising means comprises a hoist in the upper, interior portion of said tractor above said bottom opening.

22. The apparatus of claim 17 which includes means for receiving and moving the raised tray to a position in the tractor which is vertically offset from said opening.

23. The apparatus of claim 22 which includes a plurality of vertically offset positions whereby a plurality of selected raised trays may be transported by the tractor simultaneously to and from the harvesting and planting location.

24. The apparatus of claim 17 in which the cover means comprises translucent panels for permitting exposure of the living organisms in the growing trays to an outside light source during the growth period.

25. The apparatus of claim 17 in which a growth-inducing light source is provided within the growing section whereby the organisms during their growth cycle may be exposed to light from said source.

26. The apparatus of claim 17 which includes means for introducing carbon dioxide into at least one of said sections during the growth cycle of the organism while said cover means is in the closed position.

27. The apparatus of claim 17 which includes means for introducing oxygen into at least one of said sections during the growth cycle of the organism while said cover means is in the closed position.

28. The apparatus of claim 17 including means within each section for exposing the living organisms in the trays to a nutrient solution and passageways within each section isolated from the nutrient solution for temperature-conditioned water.

29. The apparatus of claim 18 in which said growing section includes a receptacle for receiving a nutrient solution and for supporting the trays in contact with the nutrient solution, said receptacle being at least partially surrounded by a body of temperature-conditioned water.

30. An apparatus for growing living organisms comprising:
(a) an elongated channel having a bottom and side and end walls;
(b) passageways containing a circulating temperature-conditioned liquid within said channel;
(c) a plurality of reservoirs for a nutrient solution arranged longitudinally of said channel in heat-exchange relationship with said passageways;
(d) means for temperature-conditioning the liquid in said passageways;
(e) means for circulating nutrient solution through said reservoirs;
(f) trays in said reservoirs for supporting growing organisms in contact with said nutrient solution;
(g) a plurality of covers covering said passageways and said reservoirs to prevent free access of ambient atmosphere thereto; and
(h) means for removing selected covers to provide access to organisms growing in selected reservoirs for harvesting.

31. The apparatus in claim 30 in which the upper surfaces of the side walls are provided with tracks for a horizontally-movable harvesting tractor.

32. The apparatus in claim 30 in which the covers are hinged to the upper edge of at least one of said side walls.

33. The apparatus in claim 30 in which the covers comprise translucent panels for permitting exposure of the growing trays to an outside light source during the growth period.

34. The apparatus of claim 30 including means for adding carbon dioxide gas to the temperature-conditioned liquid in said passageways.

35. The apparatus of claim 30 including means for adding oxygen gas to the nutrient solution circulated through said reservoirs.

36. The apparatus of claim 30 in which the cover means is provided with a light source whereby the organisms during their growth cycle are exposed to light from said source.

37. The apparatus of claim 36 in which the light source is an electric light positioned on the underside of the covers and above said reservoirs.

38. A tractor for harvesting living organisms grown in a plurality of spaced growing trays arranged in horizontally-disposed spaced relationship in a growing section having covers for the trays which comprises:
(a) an opening in a bottom wall of said tractor for receiving a selected growing tray and at least a portion of the corresponding cover;
(b) means operating through said opening for removing and replacing the covers for the selected trays;

(c) means for lifting the selected tray through said opening into said tractor when said covers are removed; and (d) means for moving the tractor and the lifted tray from the growing location to a harvesting location.

39. The tractor of claim 38 in which the lifting means comprise a hoist within the tractor above said opening.

40. The tractor of claim 38 which includes means for moving the lifted tray to a tray support in the tractor which is vertically offset from said opening.

41. The tractor of claim 38 which includes a plurality of vertically offset tray supports arranged in vertically spaced relationship whereby a plurality of selected lifted trays may be transported by the tractor to the harvesting location.

42. The method of claim 1 wherein the living organism is supported within said removable structure in a particulate medium comprising inert furnace slag.

43. The apparatus of claim 17, wherein said trays have overlying structures supporting thimbles for the growing living organism, said thimbles comprising hollow cylindrical tubes substantially packed with a porous wadding.

* * * * *